Aug. 8, 1933.                W. W. GARSTANG                1,921,461
              PROTECTING CURRENT INTERRUPTER IN B BATTERY ELIMINATORS
                    Filed July 30, 1932           3 Sheets-Sheet 1
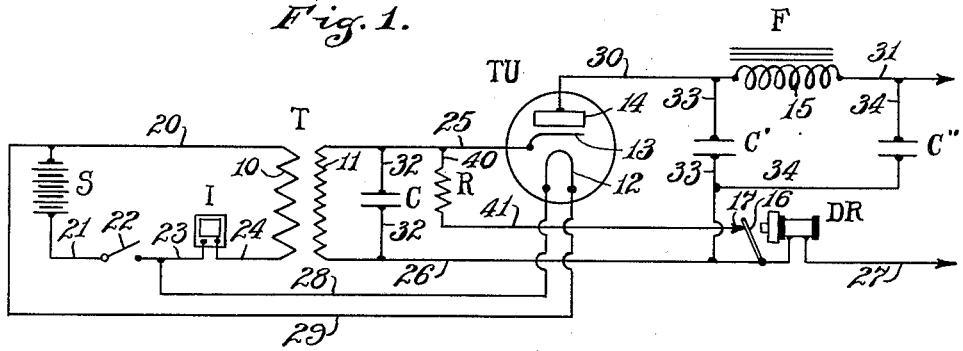
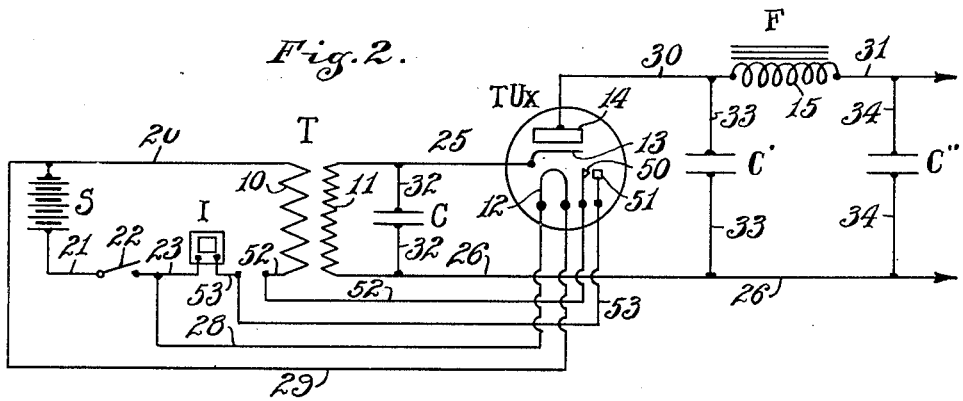
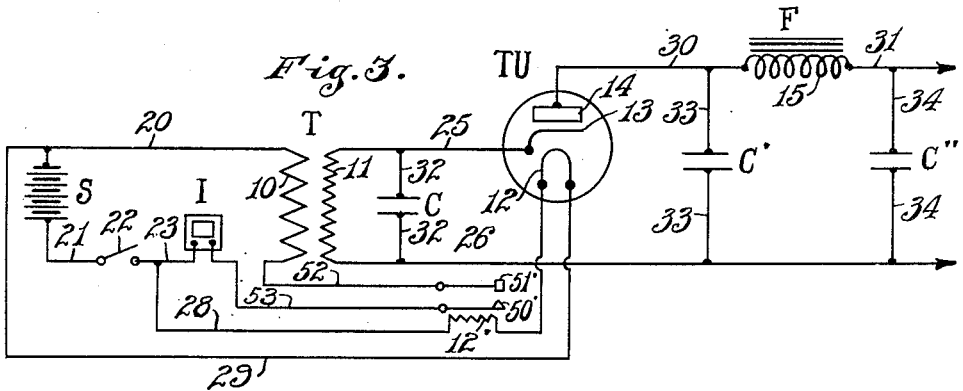
INVENTOR.
William W. Garstang,
BY
Hood & Hahn
ATTORNEYS

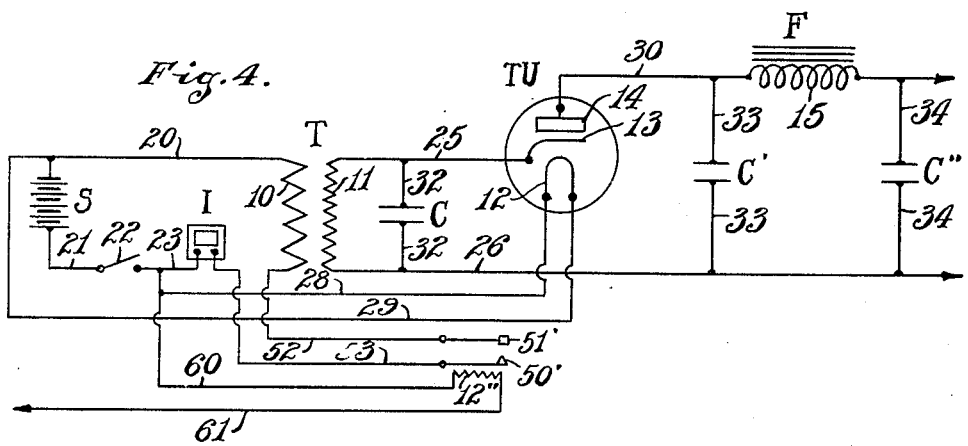
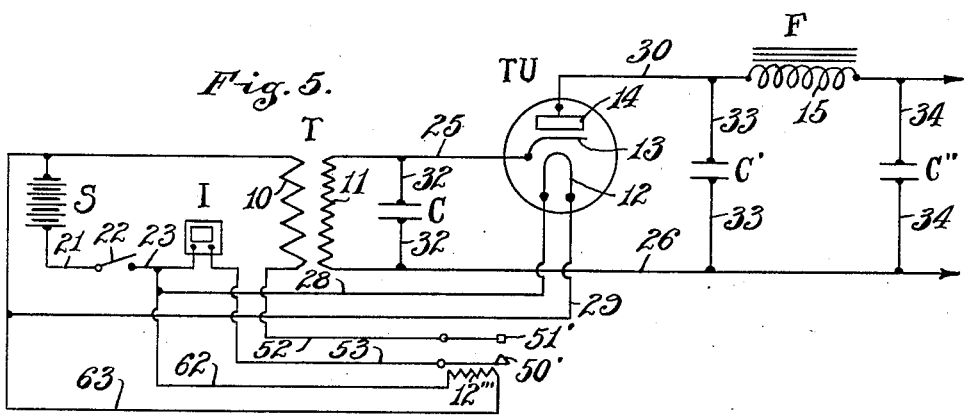
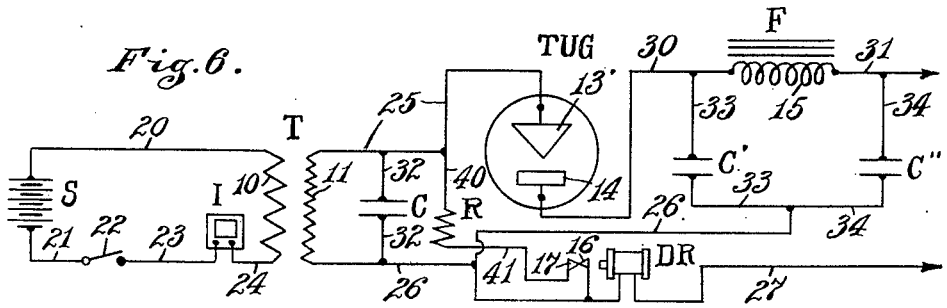
INVENTOR.
William W. Garstang,
BY
Hood + Hahn.
ATTORNEYS Aug. 8, 1933.   W. W. GARSTANG   1,921,461
PROTECTING CURRENT INTERRUPTER IN B BATTERY ELIMINATORS
Filed July 30, 1932   3 Sheets-Sheet 3
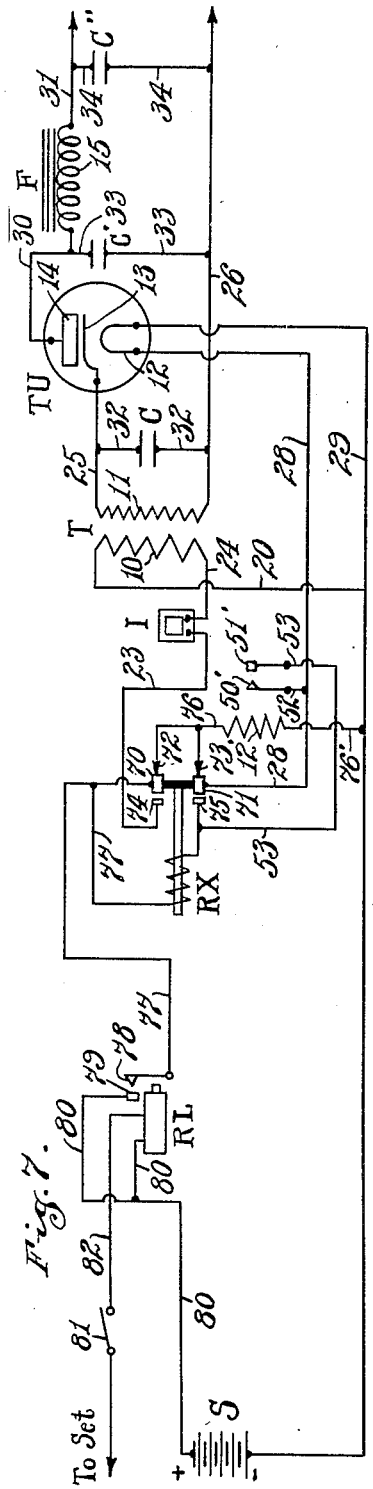
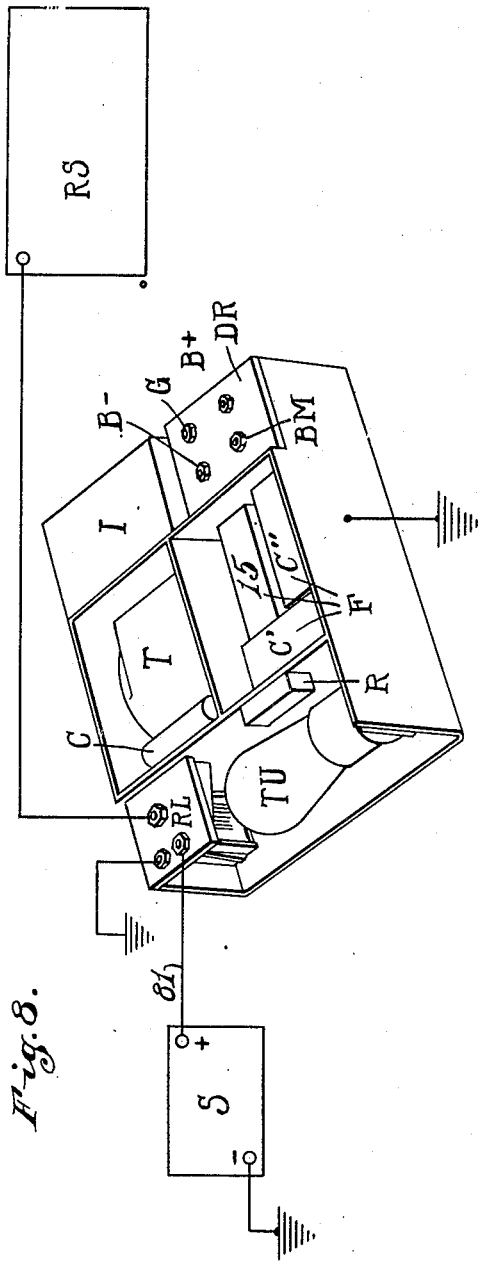
INVENTOR.
William W. Garstang,
BY
ATTORNEYS Patented Aug. 8, 1933

1,921,461

UNITED STATES PATENT OFFICE 1,921,461

PROTECTING CURRENT-INTERRUPTER IN B BATTERY ELIMINATORS

William Walk Garstang, Indianapolis, Ind.

Application July 30, 1932. Serial No. 626,774

13 Claims. (Cl. 171—97)

Devices have heretofore been provided for converting low-voltage direct current into higher voltage direct current by the utilization of an interrupter in the low-voltage energizing circuit and a rectifier and filter in the secondary circuit, but where such a converter is used for supplying the higher-voltage current to a circuit which does not become fully loaded for an appreciable time following initial energization of the low-voltage supply circuit, (as for instance where the converter is used to supply higher-voltage current to the tube circuits of radio apparatus) great difficulty is experienced because of rapid deterioration of the rectifier, the filter and the separable terminals of the interrupter during the period while the output circuit is acquiring its full load.

One of the objects of my present invention is to provide automatic means in a converter of the above-described character, by which the interrupter, the rectifier tube and the filter will be protected against injury during the periods while the output circuit is acquiring its normal load. This feature of my invention is particularly useful for supplying current to radio tubes from storage batteries or low voltage D. C. generators but is not limited to such use.

In the installation of radio reception apparatus in automobiles, a B-battery eliminator, preferably of the character described above, is desirable and, as different makes of automobiles differ in their electric circuits, some grounding the negative side of the battery while others ground the positive side, difficulty has been experienced because the character of wiring in the radio hook-up resulted in annoying interference.

One of the objects of my present invention is to provide a compact B-battery eliminator applicable to automobiles of either type and requiring a minimum length of wire for connection with the storage battery of the ignition system.

The accompanying drawings illustrate my invention.

Fig. 1 is a diagram of one form of converter (B-battery eliminator) in which the interrupter is protected by an initial loading of the output circuit which loading is automatically removed when the output circuit has warmed up and acquired its normal;

Fig. 2 is a diagram of another form of my invention in which the connection between the battery and the transformer (including the interrupter) is automatically delayed, until the output circuit has acquired its normal load, by thermostatic means incorporated in the heater tube of the output circuit;

Fig. 3 is a diagram of another form of my invention of the type of Fig. 2, in which the thermostatic control is external to the heater tube;

Fig. 4 is a diagram showing another modification in which the thermostatic switch is responsive to current flow in the filament supply leads of the external load and the interrupter is cut in after a predetermined time lapse relative to output flow;

Fig. 5 is a diagram showing another modification in which the thermostatic switch is responsive to current flow from the source and the interrupter is cut in after a predetermined time lapse relative to establishment of such flow;

Fig. 6 is a diagram of another modification in which the thermally-responsive switch is automatically cut out after functioning;

Fig. 7 is a diagram of another modification with a gaseous rectifier; and

Fig. 8 is a diagram of those portions of an automobile and a radio receiving apparatus sufficient to illustrate my improved B-battery eliminator.

Referring first to Fig. 1, T indicates a transformer having primary 10 and secondary 11; TU is a rectifier tube of any desired type (though probably preferably of the mercury vapor type having heater 12) with cathode 13 and plate 14; F is an ordinary filter capable of reducing pulsating current to direct current and having coil 15 and condensers C' and C''; DR is a relay having armature 16 and its cooperating terminal 17, and so proportioned as to act to cause terminal separation only when the rectifier tube is in normal operating condition and the output load is substantially normal; R is a resistance which will afford a load approximating the normal operating load of the output circuit; I is an interrupter of well-known form; C is a condenser of well-known form, and S is a source of direct current, such as the usual storage battery and/or low-voltage D. C. generator, of an ignition system of an automobile.

S is connected at one side by wire 20 with one end of 10 and at the other side by wire 21 with one side of a switch 22, the other side of which is connected by wire 23 with one side of I the other side of which is connected by wire 24 with the other end of 10.

One end of 11 is connected by wire 25 with 13 and the "other" end is connected by wire 26 with one end of the coil DR and with armature 16. The other end of the coil of DR is connected by wire 27 to the external load (the tube set).

Heater 12 of TU is connected by wires 28 and 29 respectively with the opposite sides of the source S with switch 22 interposed.

Wire 30 leads from 14 to one end of 15 and wire 31 leads from the other end of 15 to the external load. Condenser C is bridged by wires 32 from 25 to 26 between 11 and 13; condenser C' is bridged by wires 33 from 30 (between 14 and 15) to wire 26 between 11 and 16; and condenser C'' is bridged by wires 34 from 31 to 26 between 11 and 16.

The temporary load for the output circuit, resistance R, is connected by wire 40 with wire 25 between 32 and 13 and by wire 41 with 17.

In operation, closing of switch 22 energizes primary 10, interrupter I and heater 12. The consequent energization of secondary 11 and the other parts of the output circuit will be against the temporary load of R but when the output circuit acquires its normal operating load, DR will be sufficiently energized to withdraw 16 from 17, thus cutting out the temporary load R providing TU has reached its normal operating temperature. The interrupter I is thus protected against excessive sparking.

It will also be noted that the voltages impressed upon tube TU will be within the limits of safety of the tube at all times because resistance R prevents high voltages being impressed on the tube while it is being warmed up. DR is so proportioned that it will not cause opening at 16–17 until TU has sufficiently warmed and the external load is applied.

Whenever the normal output load decreases for any reason below the energization value of DR, 16 will again contact with 17 and cut in the temporary load of R until the output circuit resumes its normal operating load.

Referring now to Fig. 2, tube TU$x$ is similar to tube TU in its heater 12, cathode 13 and plate 14 but has incorporated therein a thermally-responsive terminal 50 which, in response to sufficient heat from heater 12, moves into contact with a companion terminal 51 also incorporated in tube TU$x$. Terminals 50 and 51 are connected by wires 52 and 53, respectively, in series with interrupter I and primary 10. In the absence of DR wire 26 forms one lead of the output circuit.

In operation closing of 22 energizes heater 12, but 50 being separated from 51, the transformer T and interrupter I are energized. Heater 12 gradually warms the thermostatic terminal 50 which, responding thereto, contacts with 51 by the time tube TU$x$ is sufficiently warm, so that interrupter I is cut in and transformer T is energized only when the output circuit is in condition to offer its normal load.

Referring now to Fig. 3. The thermally-responsive terminal 50' and its fellow 51' are outside the tube TU and consequently I place in the heater circuit, say in wire 28, a heater element 12' in position to thermally affect terminal 50' to cause it, when sufficiently heated, to move from cold-open position into contact with its fellow 51', thereby affecting the interrupter I and transformer T in the same manner as in the arrangement shown in Fig. 2.

In Fig. 4 the thermally-responsive element 50' responds to heater 12'' connected by wires 60 and 61 to the wire 23 and to the filament circuit of the external load, and is so proportioned as to sufficiently heat element 50' in the time necessary to heat heater 12 of tube TU and the heating elements of the load applied to the output wires.

In Fig. 5 the thermally-responsive element 50' responds to a heater 12''' connected by wires 62 and 63 to opposite sides of source S through switch 22; said heater 12''' being so proportioned as to sufficiently heat element 50' in the time required to heat heater 12 of tube TU and the heating elements of any load applied to the output wires.

In Fig. 6 the rectifier tube TUG is of the cold-cathode type where the cathode 13' is not preliminarily heated.

Fig. 7 illustrates an embodiment of my invention including the usual control relay of a radio-receiving set and a thermally-responsive timer, for cutting in the interrupter, which is automatically deenergized as soon as it has functioned to cut in the interrupter. In general, this arrangement is quite similar to that shown in Fig. 5, but with the following differences. A relay RX comprises the movable terminals 70 and 71, which are in contact respectively with terminals 72 and 73 when the relay is not energized, and contact respectively with terminals 74 and 75 when the relay is energized. Terminals 70 and 71 are both connected by wire 76 with one end of heater coil 12', the other end of which is connected by wire 76' with wire 29 and which is arranged to influence the thermally-responsive contact 50' whose companion terminal 51' is connected by wire 53 with terminal 75. Terminal 74 connects with one side of interrupter I through wire 23.

One end of the coil RX is connected with terminal 75 and the other end is connected by the branched wire 77 with terminal 70 and the movable terminal 78 of the relay RL usually used to automatically control the eliminator from the receiving set (not shown). The companion terminal 79 is connected by the branched wire 80 with the ungrounded side of battery S and one end of the coil RL, the other end connecting through wire 81 and switch 82 with said receiving set.

Closing of 81 energizes RL which closes 78 on 79, thus completing circuits:

(a) S, 80, 79, 78, 77, 70, 72, 73, 71, 28, 12, 29, S and (b) S, 80, 79, 78, 77, 70, 76, 12', 76', 29, S Circuit (a) activates heater 12 and circuit (b) activates heater 12' and the thermally-responsive element 50' contacts with 51' at the end of a time period sufficient to heat cathode 13 and the tubes of the receiving set, thus establishing the circuit, (c) S, 80, 79, 78, 77, RX, 53, 51', 50', 52, 28, 12, 29, S. Terminals 70 and 71 thereupon separate from 72 and 73 and contact respectively with 74 and 75 where they are held so long as a circuit is maintained through 12. This movement of 70 and 71 thus breaks the circuit through 12' (thus saving continued energization of this heater) and establishes the circuit, (d) S, 80, 79, 78, 77, 70, 74, 23, I, 24, 10, 20, 29, S thus energizing interrupter I and transformer T and initiating current flow in the output circuit as soon as it is in load condition to receive it.

Referring now to Figs. 1 and 8. In order to provide a B-battery eliminator which may be wired into a portable radio receiving set, (as in an automobile, airplane, motor boat, etc.), with a minimum length of wiring, I arrange the transformer T, interrupter I, filter F, relay DR, resistance R, and tube TU of the apparatus previously described, and the automatic relay RL for the radio-receiving set RA, into a compact unit in a metal container CT which is suitably divided, as shown.

The several devices T, I, F, DR, R and TU are wired, as described above. The cover of DR is provided with exposed terminals B+, B— and G, with B connected to wire 31 and B— connected to wire 27 while B—, BM and B— are connected by the usual resistances to provide the usual different output voltages, and terminal G is grounded on casing CT. The automatic relay RL is provided with the exposed terminal RLG which is grounded on casing CT; the exposed ungrounded terminal RLH; and the exposed ungrounded-set terminal RLHS.

It is now apparent that the B-battery eliminator unit may be mounted in any convenient position in the vehicle with its casing CT grounded thereon and that the necessary connection 90, from the ungrounded-set terminal RLHS to the receiving set RS, the connection 91 from RLH to the ungrounded terminal of source S, and suitable connections from the receiving set RS to the appropriate terminals B—, BM and B— (depending upon the character of the receiving set), may be made with a minimum of wire length.

I claim as my invention:—

1. A step-up direct-current converter, comprising a transformer having a low-voltage primary and a high-voltage secondary, an input circuit comprising the low-voltage primary, an interrupter and a switch, an out-put circuit comprising the high-voltage secondary, a rectifier tube having its cathode connected to one end of said secondary, its plate connected to one side of a filter and its heater connectible with a suitable energy source and controlled by said switch, out-put terminals connected respectively with the other end of the secondary and the outer side of the filter, and means insuring an approximately normal output load on the secondary from inception of energization of the interrupter following closing of said switch.

2. A step-up direct-current converter, comprising a transformer having a low-voltage primary and a high-voltage secondary, an input circuit comprising the low-voltage primary, an interrupter and a switch, an out-put circuit comprising the high-voltage secondary, a rectifier tube having its cathode connected to one end of said secondary, its plate connected to one side of a filter and its heater connectible with a suitable energy source and controlled by said switch, an out-put terminal at the outer end of the filter, a relay, connections between said relay and the other end of the secondary, an out-put connection with said relay, and a resistance, approximating the normal load to be connected to said out-put connections, bridged through the separable terminals of the relay between the secondary and cathode at one side and the secondary and relay at the other side.

3. A step-up direct-current converter, comprising a transformer having a low-voltage primary and a high voltage secondary, an input circuit comprising the low voltage primary, an interrupter and a switch, an output circuit comprising the high-voltage secondary, a rectifier tube with its cathode connected to said secondary, a filter connected to the plate of said tube and to said secondary, a relay connected to said secondary beyond the filter connection, and a resistance bridged across the secondary between the tube and relay coil through the normally-closed separable terminals of the relay.

4. A step-up direct-current converter, comprising a transformer having a low-voltage primary and a high voltage secondary, an input circuit comprising the said primary, and an interrupter, a rectifier tube having its cathode connected to said secondary, a filter connected to the anode of the rectifier and to the said secondary, and means insuring an approximately normal output load on said secondary from inception of energization of the interrupter.

5. A step-up direct-current converter comprising a transformer having a low-voltage primary and a high voltage secondary, an input circuit comprising the said primary, and an interrupter, a rectifier tube having its cathode connected to said secondary, a filter connected to the anode of the rectifier and to the said secondary, a relay having its coil connected to said secondary, beyond the filter connection, and a resistance approximating normal output load bridged across the secondary through normally-closed separable terminals of the relay between the secondary and tube on one side and between the secondary and relay on the other side.

6. The combination with a power supply unit including a transformer having primary and a secondary winding, a direct current source of power connected to the primary winding, a circuit interrupter between the source of power and the primary winding, said secondary winding, being adapted for connection with a load, of an artificial load connected to said secondary winding between the load and said secondary winding for directly shunting at least a part of said secondary winding, and a delayed acting means responsive to load conditions for controlling the action of said artificial load.

7. The combination with a power supply unit including a transformer having a primary and a secondary winding, a direct current source of power connected to the primary winding, a circuit interrupter between the source of power and the primary winding, said secondary winding being adapted for connection with a load, an artificial load directly shunting at least a part of said secondary winding, and delayed acting means responsive to load conditions for controlling said shunt.

8. The combination with a power supply unit including a transformer having a primary and a secondary winding, a direct current source of power connected to the primary winding, a circuit interrupter between the source of power and the primary winding, said secondary winding being adapted for connection with a load, of an artificial load directly shunting at least a part of said secondary winding, and delayed acting means responsive to load conditions for opening said shunt.

9. The combination with a power supply unit including a transformer having a primary and a secondary winding, a direct current source of power connected to said primary winding, a current interrupter connected between the source of power and the primary winding, of a rectifier in the secondary winding circuit, of an artificial load directly shunting at least a part of said secondary winding and delayed acting means responsive to conditions in the secondary winding circuit for controlling said shunt.

10. The combination with a power supply unit including a transformer having a primary and a secondary winding, a direct current source of power connected to said primary winding, a current interrupter connected between the source of power and the primary winding, of a rectifier in the secondary winding circuit, an artificial load directly shunting at least a part of said secondary winding and delayed acting means responsive to conditions in the secondary winding circuit for opening said shunt.

11. A step-up direct current converter comprising a transformer having a low voltage primary and a high voltage secondary, an input circuit comprising the low voltage primary, an interrupter and a switch, an output circuit comprising the high voltage secondary, a rectifier, in said output circuit, a filter connected to one terminal of the rectifier and to said secondary winding, a resistance bridging at least a part of the secondary winding and a delayed action controlling means responsive to conditions in the output circuit for controlling said resistance.

12. A step-up direct current converter comprising a transformer having a low voltage primary winding and a high voltage secondary winding, an input circuit comprising said primary winding and an interrupter, a rectifier having one terminal connected to said secondary winding, a filter connected to the other terminal of the rectifier and to said secondary winding, a relay having its coil connected to said secondary winding beyond the filter connection and a resistance approximating the normal output load bridged across the secondary winding through normally closed separable terminals of the relay between the secondary winding and the rectifier on one side and between the secondary winding and the relay on the other side.

13. A step-up direct current converter comprising a transformer having a low voltage primary winding and a high voltage secondary winding, an input circuit comprising the said primary winding and an interrupter, a rectifier having at least one terminal connected to said secondary winding, a filter connected to another terminal of the rectifier and to said secondary winding, and means insuring an approximately normal output load in said secondary winding from inception of energization of the interrupter.

WILLIAM WALK GARSTANG.